United States Patent
Ma et al.

(10) Patent No.: US 8,515,119 B2
(45) Date of Patent: Aug. 20, 2013

(54) CONTROL UNIT, A VIDEO DEVICE INCLUDING SAID CONTROL UNIT, AND A CONTROL METHOD

(75) Inventors: Liang Ma, Qingdao (CN); Weidong Liu, Qingdao (CN)

(73) Assignees: Hisense Beijing Electric Co., Ltd., Beijing (CN); Hisense Group Co., Ltd., Qingdao (CN); Hisense Electric Co., Ltd., Qingdao (CN)

( * ) Notice: Subject to any disclaimer, the term of this patent is extended or adjusted under 35 U.S.C. 154(b) by 1584 days.

(21) Appl. No.: 12/071,201

(22) Filed: Feb. 19, 2008

(65) Prior Publication Data

US 2009/0207318 A1 Aug. 20, 2009

(51) Int. Cl.
*G06K 9/46* (2006.01)
*G06F 3/033* (2006.01)

(52) U.S. Cl.
USPC ........... 382/100; 382/201; 382/287; 382/291; 345/158

(58) Field of Classification Search
USPC ......... 382/100, 201, 276, 287, 291; 345/157, 345/158
See application file for complete search history.

(56) References Cited

U.S. PATENT DOCUMENTS

2006/0152489 A1* 7/2006 Sweetser et al. .............. 345/158
2007/0060385 A1* 3/2007 Dohta ............................. 463/43

FOREIGN PATENT DOCUMENTS

| CN | 1919396 A | 2/2007 |
| CN | 1923326 A | 3/2007 |
| CN | 1931410 A | 3/2007 |
| WO | WO 2006/076557 | 7/2006 |
| WO | WO 2008/010950 A2 | 1/2008 |

* cited by examiner

*Primary Examiner* — Jon Chang
(74) *Attorney, Agent, or Firm* — McDermott Will & Emery LLP

(57) ABSTRACT

The present invention discloses a control unit, a video device employing said control unit and a control method thereof, wherein the control unit includes: a recognition device which is used to recognize the target in the target image; a calculation device which is used to calculate and transform the position coordinate of the recognized imaging target from the recognition device and output the position of the operation unit.

13 Claims, 6 Drawing Sheets

CONTROL UNIT, A VIDEO DEVICE INCLUDING SAID CONTROL UNIT, AND A CONTROL METHOD

TECHNICAL FIELD

The present invention relates to a control unit, a video device including said control unit, and a control method.

BACKGROUND OF THE INVENTION

With the rapid development of the interactive multimedia video device, the function of the video device is becoming more and more powerful, which brings more and more requirement for the information processing system of the video device, especially the control system, such as the response speed, processing speed and stability of the control system and the video device.

Chinese Patent CN200610087120.5 disclosed a control method and a controller, and the imaging information calculator on the controller shoots the image of the bright spots and fixed points in the target image, calculates the two-dimensional vector of the coordinates and moves the operation unit in the predetermined direction based on the calculated value of the two-dimensional vector. The deficiency of the controller is that an acceleration sensor must be employed to detect the three axis directions of the controller and determine the rotation angle of the controller about Z axis in the implementation of the controller: An 2-axis linear acceleration sensor is applied to simply detect the linear acceleration of x axis and Y axis respectively; or an gyroscope transducer is used. Due to the response delay of the acceleration sensor and the control circuit, a complicated algorithm is applied to guarantee the sensitivity and the accuracy of the acceleration sensor, which makes the response speed of the signal processing very slow. Moreover, because of the influence of sensor production and the manufacturing process of the sensor and the controller, the acceleration sensor in the controller bears poor stability and is easy to be damaged. Any improvement of the process to increase the stability of the system is at the cost of the huge material and financial resources, and the high price for a good acceleration sensor largely increases the cost of the controller.

SUMMARY OF THE INVENTION

One of object of the present invention is to provide a control unit with rapid response of signal processing, the video equipment including said control unit and the control method thereof.

In order to solve the above problem, the present invention applies the following technical scheme:

Firstly, the present invention provides a control unit to process the data from the imaging device, and said imaging device is used for shooting and imaging the target; Said control unit includes:

Recognition device, which is used to recognize the target in the target image;

Calculation device, which is used to calculate the position of the recognized target from the recognition device, and make non-vector mathematic transformation for said position to obtain the position of the operation unit and output the position signal of the operation unit.

Secondly, the present invention provides a video device which includes a display unit and further includes:

Operation unit, which is operated by the user and includes the imaging device for shooting and imaging the target;

Control unit, which is used to receive the data from the operation unit;

The foresaid control unit includes:

Recognition device, which is used to recognize the target in the target image;

Calculation device, which is used to calculate the position of the recognized target from the recognition device and make non-vector mathematic transformation for said position to obtain the position of the operation unit and output the position signal of the operation unit.

Implementation unit, which is used to receive the position signal of the operation unit from the control unit and display the position said virtual operation unit on the display unit of the video device.

Thirdly, the present invention provides a control method in which the operation unit is used to control the display unit. The said control method includes the following steps:

S1 setting the imaging target;

S2 using the operation unit to shoot and image the target;

S3 recognizing the imaging target in the target image;

S4 calculating the position of the recognized imaging target and making linear transformation for said position according to the position of the imaging target/the resolution of the imaging device*the movable width of the operation unit to get and output the position signal of the operation unit;

In S5, the display unit receiving the position signal of the operation unit and displaying the position of the virtual operation unit.

In the present invention, the speed of the signal processing and the signal response is largely increased by calculating and then transforming the position of the target of the target image. The present invention will be described in detail with reference to the accompanying drawings and the said objective, characteristic and advantage of the present invention will be more evident.

DETAILED DESCRIPTION OF THE EMBODIMENTS

To help those stilled in the relevant technical field understand the present invention and to make the objects, characteristics and advantages of the present invention more evident, the present invention will be described in further detail with reference to embodiments and the accompanying drawings.

Figure 1:
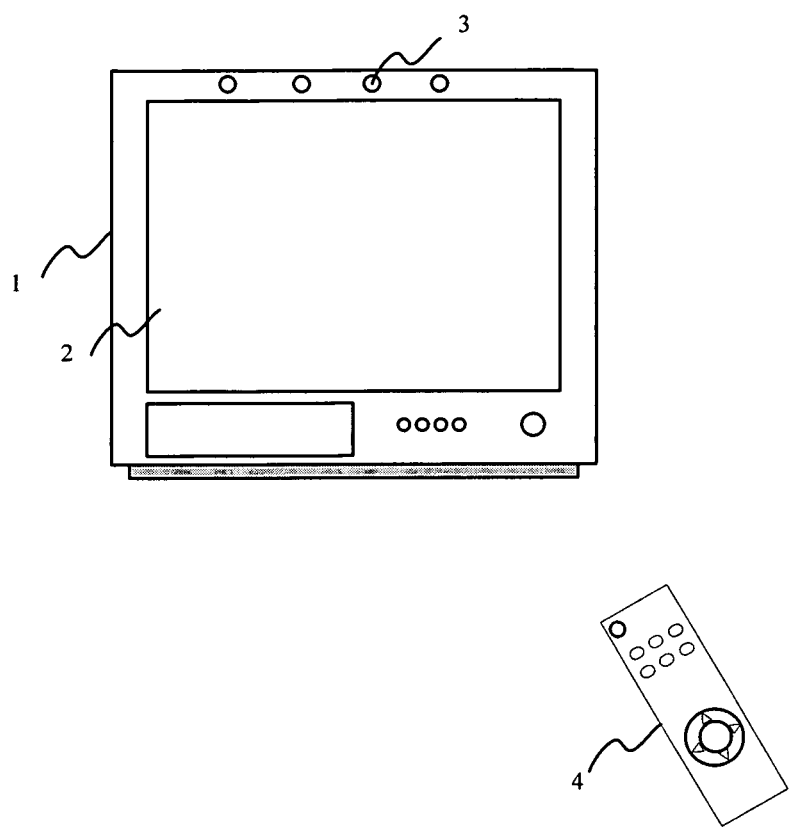
FIG. 1 is the external schematic diagram in accordance with the first embodiment of the video device.
Figure 2:
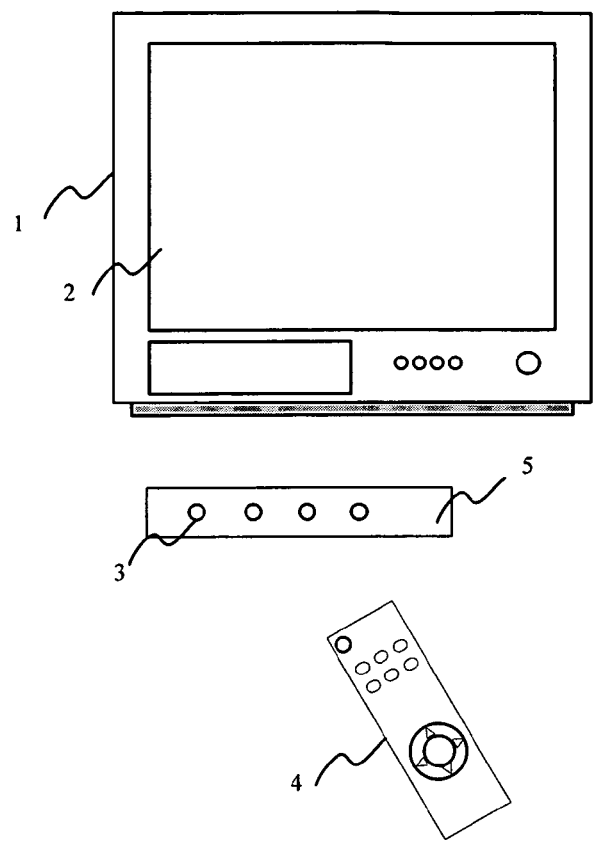
FIG. 2 is the external schematic diagram in accordance with the second embodiment of the video device.
Figure 3:
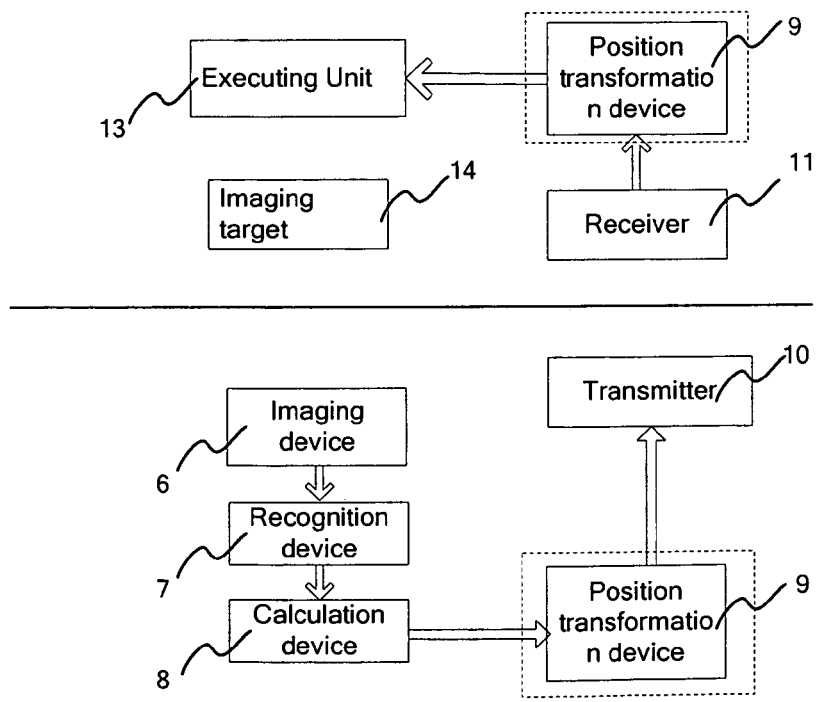
FIG. 3 is the internal block diagram in accordance with an embodiment of the video device.

Refer to FIG. 1 to 3, a remote control system of TV device is described as an embodiment of the video device of the present invention. FIG. 1 and FIG. 2 are the illustrated external views of the remote control system of the TV device, including TV 1, display 2, and remoter 4 which sends the operation data to the TV. mark points 3 are set nearby the display 2, and the target 14 is the mark point group consisting of several mark points 3.

The mark points 3, specified as infrared LED, emit the light in the infrared band. In order to expand the visible angle of the infrared light emitted from mark points 3, floodlight membrane, preferred to be thin ground glass, can be adhered on the mark points 3. The mark points 3 can be set on any position that can be shot by remoter 4; it can be set on TV 1 (show as in FIG. 1) or individually set on the mark device 5 (show as in FIG. 2). The mark points 3 are the contour points on top and bottom of the predetermined position and the predetermined object respectively, as well as the differentiation points on the connecting line of the top contour points and their bottom counterpart, and the distances between the differentiation point and the contour point on the top differs from the distance between the differentiation point and the contour point on the bottom. The contour points can identify the profile of the target (such as the shape) according to the distribution of the contour points. The differentiation points can distinguish each contour point according to the distance between the differentiation point and the contour point. The number of contour points is 2 or more, and the number of differentiation points is 1 or more. The more the contour points and differentiation points, the more easily the instantaneous position and attitude of the imaging target can be represented. When the target 14 represents a symmetric image, one or more directional points are set in the imaging target 14 to decide the direction of the imaging target. The mark points can constitute a polygon, and each mark point, except for the directional point, corresponds to a vertex of the polygon. Instead, the directional point can be placed near some vertex of the polygon. In the TV system of the present embodiment, the target 14 is preferred to be four mark points with equal interval, and the number of the mark points can also be 6, 8, 10 or more. In the image data of target 14, the predetermined distribution character of the target 14 is identified from the infrared luminescence points in the image and each of the several luminescence points is identified specifically to be a contour point, a differentiation point or a directional point.

FIG. 3 is an illustrated internal view of the TV remote control system which is divided into two kinds: the remoter end and the corresponding TV end. The remoter end includes imaging device 6, recognition device 7, calculation device 8, position transformation device 9 and the transmitter 10; The TV end includes the target 14, the receiver 11, position transformation device 9 and the executing unit 13. Each mark point 3 in the target 14 emits infrared light.

In the operational scope of the remoter, the imaging device 6 shoots the image of the target 14 to obtain the image data of the target image.

Then the target image is transferred to the recognition device 7 to be recognized, and highlight area, appeared in the data of the shot image and formed by the target image, a few light spots of noise and the light of fluorescent lights. In the image data of the shot image, the image of each mark point 3 in the target 14 appeared as the highlight area can be directly detected as the first choice of the target image. For each detected highlight area, Considering that the target image has the predetermined size, what need to do is to compare each detected highlight area to see if its size falls in the predetermined scope of size; that is, if some detected highlight area is within the predetermined scope of the size, the highlight area can be considered as the target image, otherwise it is determined as non-target image. But in the present invention, in order to improve the accuracy of the detection and recognition, binarization device 22 is employed in the recognition device 7 to convert the target image to be binary, remain the image of each mark point 3 in the target 14 and remove all other gray levels of background. Many methods of image binarization, such as threshold method, boundary detection method and the region growing method, can be applied in the present invention. Herein, the application of threshold method in the present invention will be described.

Figure 5:
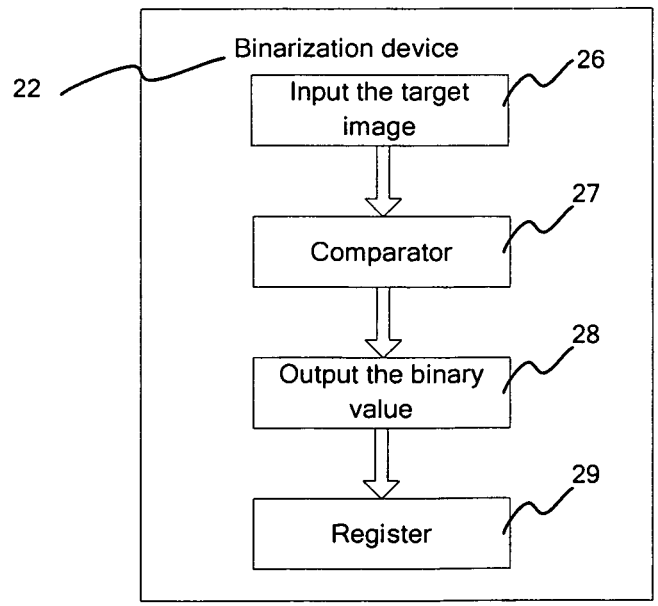
FIG. 5 is the internal flow chart in accordance with an embodiment of the binarization device.
Figure 6:
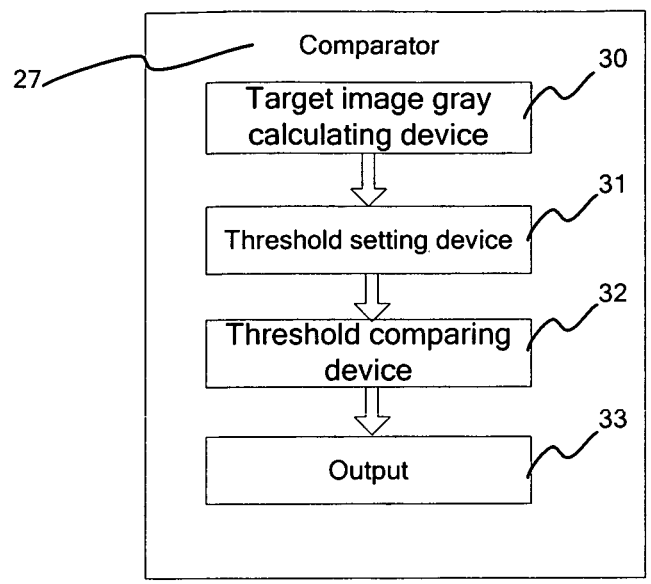
FIG. 6 is the internal flow chart in accordance with an embodiment of the comparator.

As shown in FIG. 5 to 6, the image of the target 26 is input firstly and then compared in the comparator 27.

The detailed working process of the comparator 27 is shown below: divide the image of the imaging target into different areas according to the pixels, calculate the image gray of the pixels of the target (that is the image of the target input to the comparator), set a gray threshold in each area, compare the brightness of each pixel with the set grey threshold and present "1" if the brightness is higher than the threshold or "0" if lower. After binarization, the image shown in the image of the imaging target are the digital pictures represented by "0" and "1", and the digital image is saved in the register 29 to provide image data information for the following process.

Figure 4:
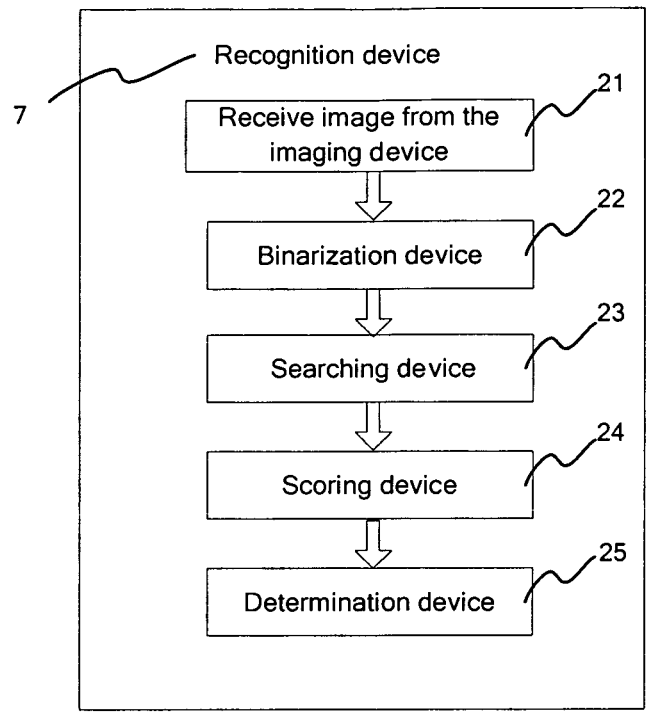
FIG. 4 is the internal flow chart in accordance with an embodiment of the recognition device.

In order to locate the final position of the target in the target image more precisely, searching device 23 and scoring device 24 are also employed in the recognition device 7, as shown in FIG. 4. The highlight area or the binary digital image is connectively searched to obtain an independent connected area, and then the total distance between the fitting straight lines of said connected area and the ratio of the position among the connected areas are calculated to obtain the score, and then the final position of the said target is determined based on the score output from the scoring device. Said connected area can also be spots of independent highlight area, or the lighting spots formed by each mark point in the target 14 after binarization via projective transformation (such as camera imaging). Said projective transformation will be omitted here, please refer to theorem and property of projective transformation in the geometry theories. For example, there are four mark points 3 with equal interval which can emit infrared light in the target 14, and the fitting straight line of the four the mark points 3 in the target 14 is calculated and the sum of the distance between each mark point 3 and the fitting straight line and the ratio of the positions among the four mark points 3 are calculated. Since the targets are four luminous points with equal interval, features, such as four point sharing the same line and equal interval, exist in the spots formed through projective transformation(such as camera imaging), and a score of these mark points 3 are obtained by setting the scoring principle according to the theorem. The less the sum of the distance between the each mark point 3 and the fitting straight line of these mark points and the closer the ratio is to 1 the higher the score is. Scores are calculated for all possible combinations (any four points are selected), and the combination with highest score is taken as the target formed by the mark points.

Other methods are omitted here.

Figure 7:
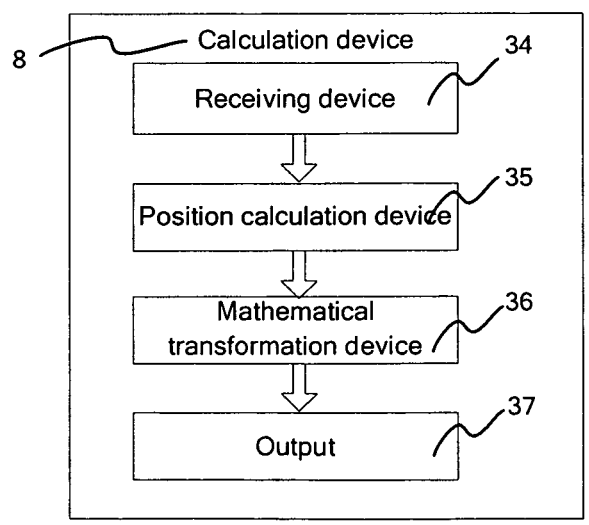
FIG. 7 is the internal flow chart in accordance with an embodiment of the calculation device.

The recognized image signal output from the recognition device 7 is sent to calculation device 8 to calculate the position of the target 14. The calculation device 8, shown as FIG. 7, specifically includes: the position calculation device 35 calculates the position of the recognized image signal output from the recognition device 7 and then the position signal is transformed in the mathematical transformation device 36. The position calculation device 35 can calculate the gravity point, the center position or other predetermined position of the target 14 by calculating the coordinate of said predetermined position, the distance or displacement of said predetermined position to a set position, or the distance ratio or displacement ratio between said predetermined position to two set positions respectively, and the specific implementation is not limited. The preferred is: the predetermined position is the gravity point and the position calculation device 35 calculates the two-dimensional coordinate of the gravity position of the target 14. Then the coordinate signal of the gravity position is transferred to the mathematical transformation device 36 to be transformed to obtain the output position of the operation unit.

There are a lot of modes for said mathematical transformation, an example is Non-vector transformation, such as: quadratic transformation, homogeneous coordinate transformation, Galileo transformation, Lorentz transformation, sphere coordinate transformation, projective matrix transformation, linear transformation, and so on. In the all above transformations, mathematical transformation is applied to obtain the final position coordinate of the imaging target, and further get the final control data.

For example, in quadratic transformation, the square of the position signal of the predetermined position is directly made as the final output position of the imaging target. Or in the projective matrix transformation, the imaging target can be firstly set in an observation coordinate system, and the model matrix is defined to implement the translation, rotation and scaling of the image of the imaging target. Then the corresponding projective matrix is defined to projective transform the coordinate position of the imaging target and transforms the imaging target form the observation coordinate system to the projection coordinate system, and then the view port matrix is defined to perform view port transformation and curtailment to determine the size of the image of the target, and the final position coordinate of the imaging target is determined according to the size of the image of the target. Other transformation methods such as homogeneous coordinate transformation, Galileo transformation, Lorentz transformation, sphere coordinate transformation, projective matrix transformation can all precisely determine the direction, shift and space of the imaging target. As an embodiment of the present invention, they will not be listed one by one here.

In the present invention, the linear transformation is preferred. In the following, the specific implementation of linear transformation, that is, the mathematical transformation device 36 performs linear transformation to obtain the final output position of the operation unit, will be described.

A lot of linear transformations may be applied by the mathematical transformation device 36, and one of them is the matrix transformation in which the display space is supposed as a linear space and a radix is set. The gravity position of the imaging target 14 is set as a matrix, and then another matrix coordinate, that is the final position of the operation unit, can be obtained by matrix linear transformation. This method can be applied in two-dimensional or three-dimensional virtual space, and the application in three-dimensional virtual space will be described in detail later. Here another method is introduced. The mathematical transformation device 36 applies the transformation of the position of the target/the resolution of the imaging device*the movable width of the operation unit, wherein the movable width of the operation unit is generally set as the resolution of the display unit. As shown in the embodiment: when the resolution of the imaging device 6 (such as vidicon) is 320×240, the gravity coordinate output by the position calculation device 35 is (100.3, 300.2). Suppose the movable area of the virtual operation unit on TV display is an image area with the width of (1024×768), then the position of the operation unit after linear transformation is (100.3/320*1024, 300.2/240*768). This method can be applied in two-dimensional or three-dimensional virtual space, and the application in three-dimensional virtual space will be described in detail later. This method has many advantages comparing other methods: 1. it greatly decreases the complexity of the calculation, producing more rapid response of the calculation; 2, the method can be easily implemented in product, especially in the conventional control device, only new algorithm needs to be added. Preferably, in the TV remote control system, the implementation is the easiest, no more new device is needed. The method can cover all of the special conditions in this control system.

Then the process enters into the position transformation device 9 which is used to receive the position of the operation unit of the calculation device and transform the position to the position of the virtual operation unit. Said transformation is applied in a display area and the position of the virtual operation unit is set as corresponding to the position of the imaging target and the method of the projective transformation is applied to output the position of the virtual operation unit. Especially, the following functions are implemented:

1. The operation unit is moved according to the position of the operation unit output from said calculation device or in the predetermined direction according to the position of the operation unit output from said calculation device. Said "predetermined direction" can be the direction predetermined by the operator, a variable determined direction, a fixed predetermined direction displayed on the display interface or the variable determined direction. For example, the operation unit can be set to move in the position indicated by the operator, yet the specific implementation is not limited.

2. The position transformation device 9 sets one pixel as the initial position (0, 0) according to the size of the TV display, the initial position is consistent with the initial position of the gravity position of the imaging target shot by the imaging device. The position of the virtual operation unit displayed on the pixel is consistent with the position of the imaging target. Said "consistent" relation means one to one, one to many or many to one, depending on the pixel of the display unit such as the TV display and the resolution of the vidicon. When the pixel on the TV display is the same as the resolution of the vidicon, the position of said virtual operation unit and the gravity position of the imaging target is one to one; When the pixel on the TV display is larger than the resolution of the vidicon, the position of said virtual operation unit and the gravity position of the imaging target is many to one; and when the pixel on the TV display is smaller than the resolution of the vidicon, the position of said virtual operation unit and the gravity position of the imaging target is one to many. One to one relation is preferred.

The position transformation device 9 make projective transformation to get the position of the pixel of the virtual operation unit on the TV display and sent to the TV display device when it receives the coordinate data of the final position of the operation unit output from the calculation device 8.

The TV end corresponding to the remoter end includes the receiver 11 and the executing unit 13. The receiver 11 receives the remote instruction of the position of the operation unit transmitted by the remoter 4 and sends it to the executing unit 13, and then the executing unit 13 displays the virtual operation unit on the TV display.

The concrete functions of the position transformation device 9 can be implemented either in the remoter or in the TV. Preferable, they are implemented in the TV by setting the position transformation device 9.

When the position of the remoter is changed, the TV continuously receives the position coordinate data of the operation unit. When the receiver 11 receives the remote instruction of the position of the operation unit transmitted by the remoter 4 and sends it to the position transformation device 9, the position transformation device 9 obtains the position of the virtual operation unit on the TV display by projection transformation and the executing unit 13 displays the virtual operation unit on the TV display. When the position of the remoter is changed, the TV continuously receives the coordinate data of the position of the operation unit, and via the position transformation device 9, the virtual operation unit, which moves with the position of the remoter, obtains its position on the TV display interface.

The operation unit is actually a position signal which can be a three-dimensional signal, two-dimensional signal or other multi-dimensional signal. The operation unit is the digital representation of the position variation of the remoter and the remoter is the physical representation of the operation unit, and operation unit can also physically represented as mobile telephone, game operation handle or other control device. The visible form of the operation unit on the TV display can be represented as the virtual operation unit, and the virtual operation unit can has various forms which can be arbitrarily determined, depending on the virtual space form of the display. The form of the virtual operation unit on the TV display can be cursor, hand shape, cute Cartoon or other preferred forms such as smiling face, apple, gem, sword, and so on.

In the virtual space displayed on the TV, variety of multimedia interfaces and option icons stored in the TV system can be selected by the virtual operation unit through the menu settlement, and the virtual operation unit selects an option icon for predetermined function after receiving a moving instruction.

With the development of the information network technology, the video control device will be equipped with more and more functions. The present invention enables the users to perform their virtual lives, such as living, studying, working, making money and consuming, in the virtual world displayed on the TV display by operating the operation device, the remoter as an example. This function requires the virtual operation unit to change with the movement of the remoter or the physical action of the users. For example, when the virtual character is in a tennis competition at the virtual playing area, the racket in the hand of the virtual character is the virtual operation unit, the direction of which varies with the direction rotation of the remoter in the hand of the user. The linear transformation applied in the calculation device in accordance with the present invention can realize the above functions. As one of the embodiments, the linear transformation device applies matrix transformation, supposes the display space is a linear space and sets a radix. The predetermined positions of all mark points in the target image are set in a matrix, and by matrix linear transformation, obtains another matrix coordinate presenting the final position of the virtual operation unit. In three-dimensional space, the coordinate can be column coordinate system or xyz coordinate, positive and negative represent the direction. According to the position of the matrix coordinate, the angle and direction of the making point of the final position of the virtual operation unit with the horizontal line, the vertical line are calculated to obtain the space movement displacement of the virtual operation unit. As another example of the embodiments, the linear transformation device uses the following transformation method: the position of an operation unit equals the value of the gravity position of the target divided by the resolution of the imaging device and multiplied by the movable width of operation unit. Generally, the movable width of the operation unit is set as the resolution of the display unit. When the resolution of the imaging device 6 (such as vidicon) is 320×240, the gravity coordinate output by the position calculation device 35 is (100.3, 300.2). Suppose the movable area of the virtual operation unit on TV display is an image area with the width of (1024×768), then the position of the operation unit after linear transformation is (100.3/320*1024, 300.2/240*768). Now, since the positions of all mark points 3 in the imaging target have been obtained, the fitting straight line of these mark points can be calculated. The calculation method can be least square method or least maximum absolute values for the residua, least sum of the absolute values for the residual. Take least square method for example, construct the fitting straight line y=a+bx and suppose that the coordinates of the four mark points are (xi☐yi), i=1, 2, . . . N. N=1, 2, 3, 4. Solve the following equations to obtain the values of a and b, and the fitting straight line.

$$\begin{cases} aN + b\sum x_i = \sum y_i, \\ a\sum x_i + b\sum x_i^2 = \sum x_i y_i \end{cases}$$

$$\begin{cases} aN + b\sum x_i = \sum y_i, \\ a\sum x_i + b\sum x_i^2 = \sum x_i y_i \end{cases}$$

Then set a horizontal line to get the angle between the fitting straight line and the horizontal line. The angle is the space moving direction of the operation unit such as the remoter. The distance between the fitting straight line and the horizontal line is the displacement of the operation unit. With the angle and the displacement, the position transformation device 9 sends instruction to make the virtual operation unit move in the predetermined direction. The angle changes with the rotation of the remoter in the hand.

Alternatively, the position of each mark point in the target image has been obtained, and the position estimation method of multi-points sharing a plane or the corresponding relation of the planar structure in the projection transformation is used to calculate to obtain the pointing direction of the remoter 4. For the specific calculation and implementation, please refer to the available calculation formula. They will not be listed here.

From the above description, the mathematical transformation device 36 is applied in the calculation device 8, and this calculation method brings a lot of advantages: 1. The method largely decreases the complexity of the calculation and speeds up the response of the video device and the control system; 2. The method has not only great advantage in the two-dimensional virtual space, but also more evident advantages in the three-dimensional virtual space. Especially, compared with the present control devices such as the game remoter, this method does not have an acceleration sensor embedded to implement the control for the direction and displacement of the virtual operation unit. Instead, it controls the direction and displacement of the virtual operation unit only by direct linear transformation arithmetic and setting the coordinate system. This method saves the cost of the control unit and is easy to implement. If the remoter of the present invention is applied, not only the cost can be largely saved, but also the conventional remoter can be improved directly. This is not like some remoter product line which needs to cost material and manpower to design new remoter structure and internal arts and crafts to meet the technical requirement; 3. The method has strong reliability. Since this method may apply the algorithm writing form, considering that the present technique of the acceleration sensor set internally may have many problems in structure and process, the present invention has strong reliability.

Figure 8:
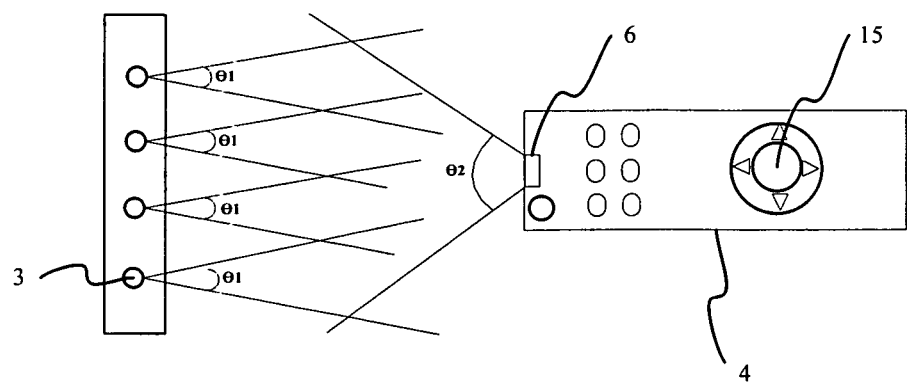
FIG. 8 is the external schematic diagram in accordance with an embodiment of the operation unit.
Figure 9:
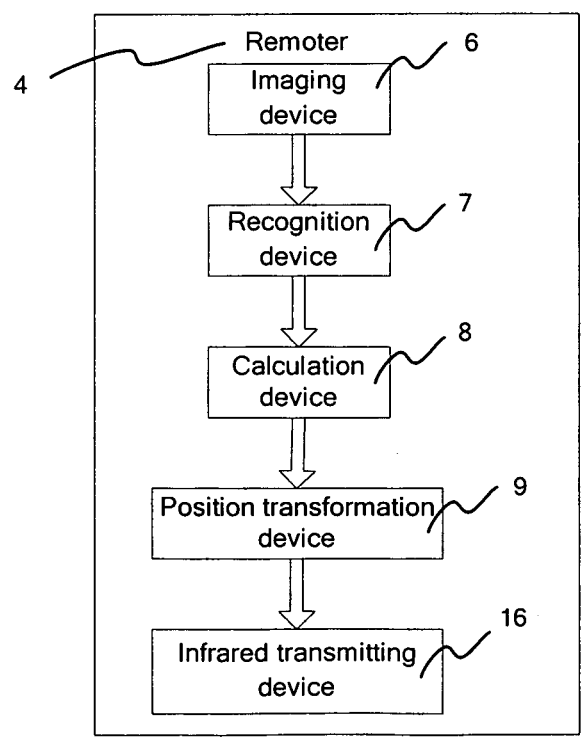
FIG. 9 is the internal flow chart in accordance with an embodiment of the operation unit.

In the following, one kind of the operation unit, such as the remoter 4 will be introduced, FIG. 8 to 9 show an exemplary remoter in accordance to an embodiment of the present invention. As shown in FIG. 8 to 9, there are some keys with common application in the remoter 4, and also there is the imaging device 6, which can be vidicon, digital camera or other matrix camera, on the remoter 4. The imaging device 6 is preferred to be CCD camera. The infrared cut-off light filter set in the external of the CCD camera is a band pass light filter with cut-off frequency of 769 nm-960 nm, that is to say, only light with wavelength in the scope of 760 nm-960 nm can pass the light filter. This frequency scope belongs to the near-infrared area, so most of the visible light can be filtered, which can improve the stability and reliability of the imaging device 6. When the camera of the remoter 4 shoots the imaging target, other visible light is filtered by the infrared cut-off filter, and the infrared light emitted from the mark points 3 of the target 14 is caught and shot to form the image of the target 14 by the camera. Preferably, the target 14 is four mark points 3 with equal interval. Each Mark point 3 emits infrared light with visual angle of Θ1, and the imaging device 6 receives the light incident on it with visual angle of Θ2. The operator grabs the remoter 4 and each mark points 3 of the imaging target exists within the visual angle Θ2 of the, imaging device 6, and the remoter 4 exists within the visual angle Θ1, in this way, the imaging device 6 of the remoter 4 can receive the infrared from the mark point 3 of the imaging target. Video device especially TV can be remotely controlled if the position and direction of the remoter 4 are changed in this range. When the position and direction of the remoter 4 go beyond the range, the operation of the remoter 4 can not be performed. Since the foresaid mathematical transformation such as linear transformation is applied in the calculation device, all kinds of visual angle of each mark point in the target can exist in the visual angle Θ2 of the imaging device, there is no need to actively adjust the foci of the camera, because the camera can automatically adjust the foci based on the distance of the imaging target and display the current position of the operation unit on the video display device. Certainly, in order to improve the accuracy and stability of the overall control system, a functional key can be set on the remoter 4 to assist in adjusting the foci of the camera. The virtual distance of the virtual space of the TV system and the remoter can also be adjusted according to the need of the operator.

The remoter 4 further includes the recognition device 7, the calculation device 8, and the position transformation device 9, all of which are implemented by the processing circuit. When the image of the target is sent to the recognition device 7, it firstly goes to the binarization device 22 to be binary. The applied binarization method is the threshold method, which sends the image of the target to the comparator for comparing. The comparator 27 includes: target image gray calculating device 30, the threshold setting device 31, the threshold comparing device 32 and the outputting setting device 33. The specific working process of the comparator 27 is: dividing the image of the target into different areas according to pixel dot, calculating the image grey of the pixel dot of the target (the image of the imaging target input to the comparator), setting a grey threshold in each area and comparing the brightness of each pixel with the grey threshold, presenting "1" if the brightness is higher than the threshold or "0" otherwise. For example, the grey value of the image is generally 0~255, supposing the grey threshold is 100, then the pixel is indicated as 1 when the brightness value of the pixel is larger than 100, otherwise 0.

After the binarization, the pictures shown in the image of the imaging target are the digital pictures represented by 0 and 1, and the digital image are saved in the register. After that the binary digital image is connectively searched in the searching device 23 to obtain an independent connected area, and then the image is sent to the scoring device 24 in which the total distance between the fitting straight lines of said connected area and the ratio of the position among the connected areas are calculated to obtain the score, and then the final position of the said imaging target is determined based on the score output from the scoring device 24. Then the signal of the final position of the imaging target is sent to the calculation device 8 to calculate the gravity position coordinate of the imaging target and perform linear transformation of the position of the gravity/the resolution of the imaging device* the movable width of the operation unit for said gravity position and output the position coordinate of the operation unit. Then the signal of the position coordinate of the operation unit enters into the position transformation device 9. The position transformation device 9 is used to receive the position signal of the operation unit of the calculation device, and transform the position to the position of the virtual operation unit. Said transformation is applied in a display area and the position of the virtual operation unit is set as the position of the imaging target and the method of the projection transformation is applied to output the position of the virtual operation unit. Especially, the following functions are implemented: According to the size of the TV display, the position transformation device 9 sets one pixel dot as the initial position (0, 0) which is consistent with the initial position of the gravity position of the target shot by the imaging device. The position of the virtual operation unit displayed on the pixel is consistent with the position of the imaging target. Said consistent relation indicates: one to one, one to many or many to one, the relation is applied depends on the pixel of the display unit such as the TV display and the resolution of the vidicon. When the pixel on the TV display is the same as the resolution of the vidicon, the relation between the position of said virtual operation unit and the gravity position of the imaging target is one to one; When the pixel on the TV display is larger than the resolution of the vidicon, the relation between the position of said virtual operation unit and the gravity position of the imaging target is many to one; and when the pixel on the TV display is smaller than the resolution of the vidicon, the relation between the position of said virtual operation unit and the gravity position of the imaging target is one to many. One to one relation is preferred. When the position transformation device 9 receives the coordinate data of the final position of the operation unit output from the calculation device 8, the position of the pixel of the virtual operation unit on the TV display can be obtained through projection transformation and sent to the TV display device through the infrared transmission device 16 or RF transmission device.

There is a confirmation key 15 in the remoter 4, and when the above functions are performed by the internal processing circuit, press the confirmation key 15 to send the confirmation signal to the TV through the infrared transmission device 16 to implement the remote control function. Since the exemplary remoter of the present invention applies linear transformation device in its calculation device, the complexity of the calculation is largely reduced and the response of the remoter is sped up, largely improving the stability and reliability of the remote control system. The number of keys to perform all functions on the remoter is largely reduced. One confirmation key 15 can implement the functions realized by 10 or more functional keys; therefore it greatly reduces the burden of the operator. Moreover, with the simplicity of the functional keys, the design of the appearance and the structure of the remoter can be optimized and made delicacy and practical.

Further, there is a direction guide key on the remoter, which can perform the movement in random direction of the virtual operation unit on the common TV and the direction guide function in the virtual space. The implementation of the direction guide key is because the calculation device inside the remoter also employs fitting straight line calculation device to calculate the fitting straight line of the imaging target and angle calculation device to calculate the angle between said fitting straight line and the horizontal line. When the position of each mark points in the target image is determined, calculate the angle between the fitting straight line of each mark points of the target image and the horizontal line, and the angle is the direction of the virtual operation unit in the virtual world and changes with the rotation of the remoter in the hand of the operator. Through the calculation of the calculation device, the displacement and direction of the virtual operation unit in the virtual space can be determined. In the virtual world, when the virtual figure set by the operator faces an item image of a fixed optional item, the direction guide key automatically switches to the item image of the faced optional item. For example, when the virtual figure wants to go to the virtual cinema, the direction guide key can automatically switch the cinema as the scene facing to the virtual figure based on the instantaneous position of the remoter, and after the virtual figure enters into the cinema, the task selection is completed through the selection of the set item by the remoter. This further increases the power of the remoter.

Figure 10:
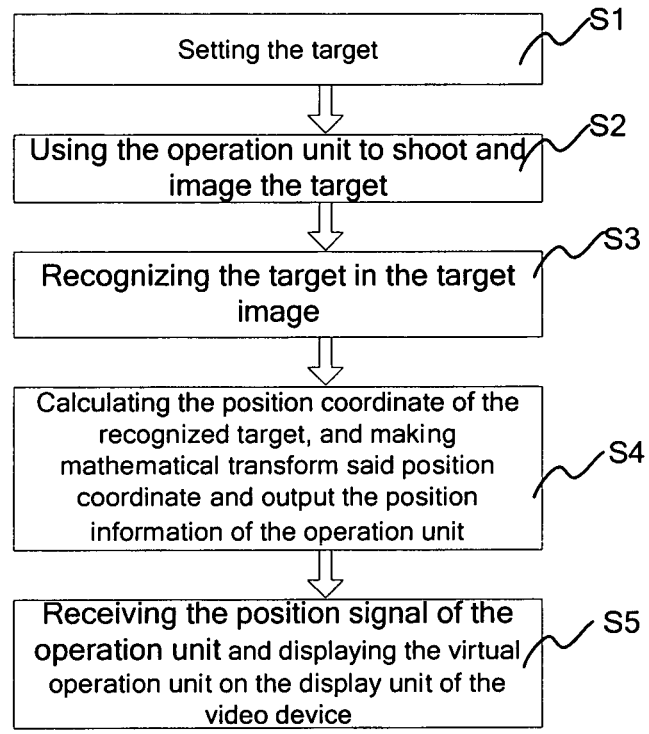
FIG. 10 is the flow chart in accordance with an embodiment of the control method of the video device.
Figure 11:
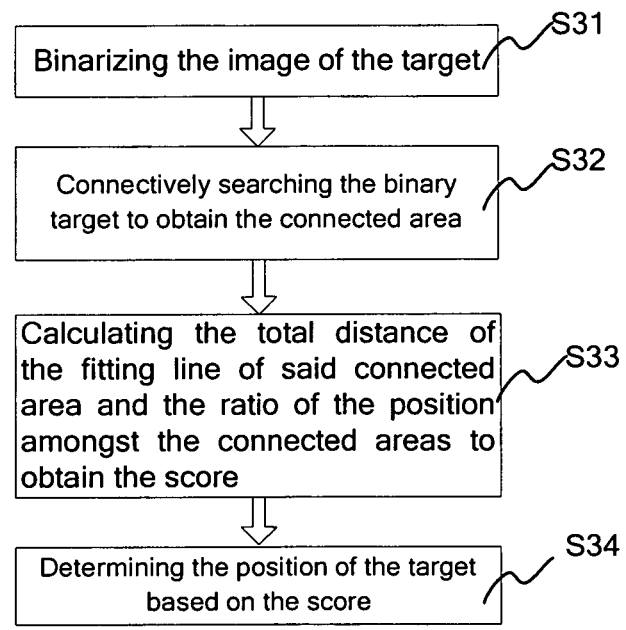
FIG. 11 is the flow chart in accordance with the embodiment of step S3 based on FIG. 10.

Based on the above control principle, a control method is offered. FIG. 10 to 11 are an exemplary TV remote control method in accordance with an embodiment of the control method of the present invention.

The TV remote control method uses the remoter to control the TV display and said control method includes the following steps:

S1 setting the target; the target 14 is set in the shooting range of the remoter 14, and preferably set on the TV, and preferably the target 14 is four mark points 3 linearly arranged with equal interval.

S2 using the operation unit to shoot the target; here the operation unit is the remoter 4, and CCD camera set on the remoter 4 is used to shoot the instantaneous image of the imaging target and an infrared cut-off filter is set at the external of the CCD camera to improve the image effectiveness of the shooting and filter other visible light.

S3 recognizing the target in the target image; S3 further includes the following steps:

S31 binarizing the target image; the preferred binarization method is threshold method, whose working principle and implementation can refer to the above description.

S32 connectively searching the binary target to obtain the connected area;

S33 calculating the total distance between the fitting straight lines of said connected area and the ratio of the position amongst the connected areas to obtain the score; preferably, the calculation method of the fitting straight line is the least square method. For example, calculating the fitting straight line of each mark point 3 in the target image and the sum of distance from each mark point 3 to the fitting straight line and the position ratio among said each mark point 3 to obtain a score of these mark point 3.

S34 determining the position of said target based on the score.

S4 calculating the position of the recognized target and making linear transformation for said position according to the position of the target/the resolution of the imaging device*the movable width of the operation unit, set the transformed position as the position of the operation unit, and output the position information of the operation unit; S4 further includes the following steps:

S42 calculating the fitting straight line of the target. This step has a wide application, which can calculate the fitting straight line of the connected area before step S33, and can be applied to calculate the fitting straight line of the final position of the recognized target when operating the displacement and direction of the operation unit in the three-dimensional space.

S43 calculating the angle between said fitting straight line and the horizontal line. Through this step, the angle can be the direction in which the operation unit moves.

After step S4, the following steps are performed:

S41 transforming the position signal of the operation unit to the position of the virtual operation unit, said transformation method is applied on the TV display and the position of the virtual operation unit in consistent with the position of the target is set, and the position of the virtual operation unit is output by projective transformation.

The movable width of the operation unit in step S4 is the movable width of the virtual operation unit.

In S5, the display unit receiving the position signal of the operation unit and displaying the position of the virtual operation unit. When the signal of the position of the virtual operation unit from step S41 is received, the position of the virtual operation unit is displayed on the TV display.

The above description is the specific embodiments of the present invention, and the present invention can also be applied in other video control devices, such as computer system, human-machine game system, projective system, IPTV (Interactive personal TV and Interactive Protocol TV), mobile telephone system, and so on. The scope of the present invention is not limited to this. It is evident that various modifications and changes may be made by those skilled in this area without departing from the spirit and scope of the present invention. Thus, the present invention is intended to embrace all such modifications and changes as may fall within the appended claims.

The invention claimed is:

1. A control unit for an interactive multimedia video device processes data from an imaging device, and said imaging device is used to shoot a target image, the control unit including:

a recognition device, which is used to recognize a target in the target image, wherein the target is a mark point group consisting of at least three mark points;

a calculation device, which is used to calculate a position of the recognized target from the recognition device and make non-vector mathematic transformation for said position to obtain a position of an operation unit and output a position signal of the operation unit, wherein the non-vector mathematic transformation in said calculation device is a linear transformation, a quadratic transformation, or a projective matrix transformation, wherein the linear transformation uses the following transformation method: the position of the operation unit equals the value of the position of the target divided by a resolution of the imaging device and multiplied by a movable width of the operation unit, and wherein the recognition device further includes:
a binarization device, employed to convert the target image to be binary;
a searching device, which is used to connectively search said recognized binary image to obtain connected areas;
a scoring device, which is used to calculate a sum of distances between fitting straight lines of said connected areas and a ratio of positions amongst the connected areas to obtain scores; and
a determination device, which is used to determine the position of the target based on scores output from the scoring device.

2. The control unit of claim 1, wherein the position of said target is a gravity position or center position of the target.

3. The control unit of claim 1, wherein the linear transformation is a matrix transformation.

4. The control unit of claim 1, wherein the calculation device further includes:
a fitting straight line calculation device, which is used to calculate fitting straight lines of the target;
an angle calculation device, which is used to calculate the angle between each fitting straight line and a horizontal line.

5. A video device for an interactive multimedia video device including a display unit, the video device further comprising:
an operation unit, which is operated by a user and includes an imaging device for shooting a target image;
a control unit, which is used to receive data from the operation unit;
said control unit including:
a recognition device, which is used to recognize a target in the target image, wherein the target is a mark point group consisting of at least three mark points;
a calculation device, which is used to calculate a position of the recognized target from the recognition device, and make non-vector mathematic transformation for said position to obtain a position of the operation unit and output a position signal of the operation unit: and
an implementation unit, which is used to receive the position signal of the operation unit from the control unit and display a virtual operation unit on the display unit of the video device,
wherein the calculation device further includes:
a fitting straight line calculation device, which is used to calculate fitting straight lines of the target; and
an angle calculation device, which is used to calculate the angle between each fitting straight line and a horizontal line;
wherein the recognition device further includes:
a binarization device which is employed to convert the target image to be binary;
a searching device, which is used to connectively search said recognized binary image to obtain connected areas;
a scoring device, which is used to calculate a sum of a distance between the fitting line of said connected areas and a ratio of positions amongst the connected areas to obtain a score;
a determination device, which is used to determine the position of the target based on the score output from the scoring device.

6. The video device of claim 5, wherein the non-vector mathematic transformation in said calculation device is a linear transformation, a quadratic transformation, or a projective matrix transformation.

7. The video device of claim 6, wherein the linear transformation uses the following transformation method: the position of the operation unit equals the value of the position of the target divided by a resolution of the imaging device and multiplied by a movable width of the operation unit.

8. The video device of claim 7, wherein the movable width of said operation unit is the resolution of the display unit.

9. The video device of claim 6, wherein the linear transformation is a matrix transformation.

10. The video device of claim 5, wherein the video device further includes:
a position transformation device, which is used to receive the position of the operation unit of the calculation device, and transform the position of the operation unit in the display unit to the position of the virtual operation unit.

11. A control method using an operation unit to control a display unit, the control method comprising:
setting a target, wherein the target is a mark point group consisting of at least three mark points;
using the operation unit to shoot a target image;
recognizing the target in the target image;
calculating a position of the recognized target and making linear transformation for said position according to the following transformation method: the position of the operation unit equals the value of the position of the target divided by a resolution of the imaging device and multiplied by a movable width of the operation unit, to get and output the position information of the operation unit;
the display unit receiving a position signal of the operation unit and displaying the position of the operation unit,
wherein the step of calculating the position further includes the following steps:
calculating a fitting straight line of the target; and
calculating an angle between said fitting straight line and a horizontal line, and
wherein the step of recognizing the target further includes the following steps:
binarizing the image of the target;
connectively searching the binary target image to obtain connected areas;
calculating a sum of the distance between the fitting lines of said connected areas and a ratio of the positions amongst the connected areas to obtain the score; and
determining the position of said target based on the score.

12. The method of claim 11, wherein the control method further includes the following steps:
transforming the position signal of the operation unit to a position of a virtual operation unit and outputting the position of the virtual operation unit, and
the display unit receiving the position of the virtual operation unit, and displaying the position of the virtual operation unit.

13. The method of claim 12, wherein the movable width of said operation unit is the resolution of the display unit.

* * * * *